United States Patent
Babin (10) Patent No.: US 7,051,857 B2
(45) Date of Patent: May 30, 2006

(54) COUPLING DEVICE AND IMPROVED METHOD OF CONTROLLING TORQUE TRANSMISSION

(75) Inventor: Christopher J. Babin, Sterling Heights, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/795,651

(22) Filed: Mar. 8, 2004

(65) Prior Publication Data

US 2005/0194231 A1    Sep. 8, 2005

(51) Int. Cl.
F16D 43/284    (2006.01)

(52) U.S. Cl. .................. 192/103 F; 192/85 R; 137/539.5

(58) Field of Classification Search ........... 192/85 AA, 192/85 R, 103 F; 475/88, 120; 137/539.5, 137/625.65

See application file for complete search history.

(56) References Cited

U.S. PATENT DOCUMENTS

| | | | | |
|---|---|---|---|---|
| 5,051,631 A | * | 9/1991 | Anderson | 137/625.65 |
| 5,984,259 A | * | 11/1999 | Najmolhoda et al. | 137/625.64 |
| 6,164,322 A | * | 12/2000 | Najmolhoda et al. | 137/539 |
| 6,209,563 B1 | | 4/2001 | Seld et al. | 137/15.21 |
| 6,802,791 B1 | * | 10/2004 | Yoshioka | 475/88 |
| 6,902,506 B1 | * | 6/2005 | Schrand | 192/85 AA |

* cited by examiner

Primary Examiner—Rodney H. Bonck
(74) Attorney, Agent, or Firm—L. J. Kasper (57) ABSTRACT

A method of controlling a pressure control valve assembly (69) to control a control pressure (43,71) in a system (11) including a source (47,49) of pressurized fluid. The control valve assembly is operable to vary the control pressure in response to variations in an electrical input signal (87) to an electromagnetic coil (81). The control valve assembly defines an inlet (77) in communication with the control pressure, an outlet (93) in communication with the low pressure, and a valve seat (89) disposed intermediate the inlet (77) and the outlet (93). A poppet valve member (91) is biased toward the valve seat by a biasing means including an armature (95), the biasing force being generally proportional to the input signal to the coil. The method comprises the steps of selecting a predetermined, minimum pressure for the control pressure corresponding to a minimum condition of the system. Next is selecting the biasing means to apply a biasing force to the poppet valve (91) corresponding to a fluid pressure less than the predetermined minimum pressure for the control pressure. The last step is selecting the electrical input signal (87) to correspond to the desired control pressure, an increasing input signal resulting in an increasing biasing force on the poppet valve member (91), but with no substantial movement thereof.

7 Claims, 4 Drawing Sheets

COUPLING DEVICE AND IMPROVED METHOD OF CONTROLLING TORQUE TRANSMISSION

TITLE OF INVENTION

Couple Device and Improved Method of Controlling Torque Transmission.

BACKGROUND OF THE DISCLOSURE

The present invention relates to coupling devices of the type used to transmit torque, for example in a vehicle drive line, and more particularly, to a method of controlling the transmission of torque in and through such a coupling device.

As used herein, the term "coupling device" will be understood to mean and include a device which is able to transmit torque from an input to one or more outputs, and in which there is a clutch assembly disposed between the input and the output, such that the amount of torque transmitted is a function of the extent of engagement of the clutch assembly. Within the scope of the present invention, the term "coupling device" means and includes both gear-type devices (such as differentials), as well as gearless-type couplings.

Although the control method of the present invention may be utilized with many different types and configurations of coupling devices such as a coupling made in accordance with the teachings of U.S. Pat. No. 5,964,126 assigned to the assignee of the present invention and incorporated herein by reference, it is especially advantageous when utilized in conjunction with vehicle differentials of the type illustrated and described in U.S. Pat. Nos. 5,310,388 and 6,464,056, both of which are also assigned to the assignee of the present invention and incorporated herein by reference.

In the differential coupling devices of the cited patents, there is a clutch pack operable to transmit torque between the input (housing connected to the ring gear) and the output (one of the axle shafts), with the degree of engagement of the clutch pack being determined by the fluid pressure in a piston chamber. The fluid pressure biases a clutch piston against the clutch pack. The differential coupling devices of the cited patents include a gerotor pump having one rotor fixed to rotate with the input and the other rotor fixed to rotate with the output, such that the flow of pressurized fluid into the clutch piston chamber is generally proportional to the speed difference between the input and the output. As used herein, the term "clutch pack" will be understood to mean and include both a multiple friction disc type clutch pack, as well as any of the other well known types of clutch assemblies, such as cone clutches, in which the degree of engagement is generally proportional to the fluid pressure acting on the clutch piston, or on an equivalent clutch-engagement structure.

In differential coupling devices of the type described above, it is typical to provide a flow path from the clutch piston chamber to a reservoir or some other source of low pressure fluid, and to provide in this flow path some sort of control valve which can control the flow from the clutch piston chamber to the low pressure source, thereby controlling the pressure in the clutch piston chamber, and therefore, controlling the "bias torque", i.e., the extent to which torque is transmitted from the input to the output.

It has been known in prior art coupling devices of the type described above to provide a control valve of the type which comprises a flow metering type of device, in other words, a device which is essentially a variable flow restriction type of device. In such a device, fluid flows through a small orifice, with the pressure in the clutch piston chamber being determined by the "back pressure" created by the flow of fluid through the orifice. As has been recognized by those skilled in the art for some time now, one of the problems associated with this type of clutch pressure control is that the flow (and therefore, also the "clutch pressure") is very much dependent upon factors such as fluid viscosity and fluid temperature which, in many devices of the type to which the present invention relates, will vary significantly during the period of operation of the device. Therefore, consistency of operation is difficult to achieve in coupling devices having the prior art type of pressure control system described above.

Increasingly, vehicle differential coupling devices of the type to which the present invention relates are being utilized in conjunction with ABS ("Anti-skid Braking Systems"), and various other types of active ride control and vehicle dynamics control systems. When a vehicle differential coupling device is utilized in conjunction with such systems, it is critical to be able to vary the bias torque (i.e., the degree of torque transmission) at a rate of response which is not only very fast, but which is also predictable and repeatable.

BRIEF SUMMARY OF THE INVENTION

Accordingly, it is an object of the present invention to provide an improved method of controlling the transmission of torque in a coupling device which overcomes the disadvantages of the above-described prior art.

It is a more specific object of the present invention to provide a method of controlling the transmission of torque which achieves the above-stated object, but in which variations in the extent of torque transmission do not depend solely upon, nor are they caused by, variations in the rate of a fluid flow out of the clutch piston chamber.

It is another object of the present invention to provide such an improved method of controlling torque transmission in which the clutch piston pressure is directly proportional to an electrical input signal, but in which no movement of a valve member is required in order to vary the clutch piston pressure, as the term "no movement" will be defined hereinafter.

The above and other objects of the invention are accomplished by the provision of an improved method of controlling the transmission of torque in a coupling device including an input and at least one output, the coupling device comprising a housing defining a clutch cavity. A clutch assembly is disposed in the clutch cavity and includes a first clutch member fixed to rotate with the input, and a second clutch member fixed to rotate with the output. A clutch apply member is disposed in a pressure chamber and is operable to bias the first and second clutch members into torque-transmitting relationship in response to the presence of pressurized fluid in the pressure chamber. The coupling device includes a source of the pressurized fluid, and a control valve assembly operable to vary the fluid pressure in the pressure chamber, in response to variations in an electrical input signal transmitted to an electromagnetic coil. The control valve assembly defines an inlet in fluid communication with the pressure chamber, an outlet in fluid communication with a source of low pressure fluid, and a valve seat disposed intermediate the inlet and the outlet. A poppet valve member is biased toward the valve seat by a biasing means including an armature, the biasing force applied by the armature to the poppet valve member being generally proportional to the electrical input signal to the electromagnetic coil.

The improved control method comprises the steps of selecting a predetermined minimum fluid pressure in the pressure chamber, corresponding to a predetermined minimum bias torque for the clutch assembly. The next step is selecting the biasing means to apply a biasing force to the poppet valve member corresponding to a fluid pressure less than the predetermined fluid pressure. The last step is selecting the electrical input signal to correspond to the desired fluid pressure in the pressure chamber and the desired bias torque for the clutch assembly, an increasing electrical input signal resulting in an increasing biasing force on the poppet valve member, but with no substantial movement thereof.

DETAILED DESCRIPTION OF THE PREFERRED EMBODIMENT

Figure 1:
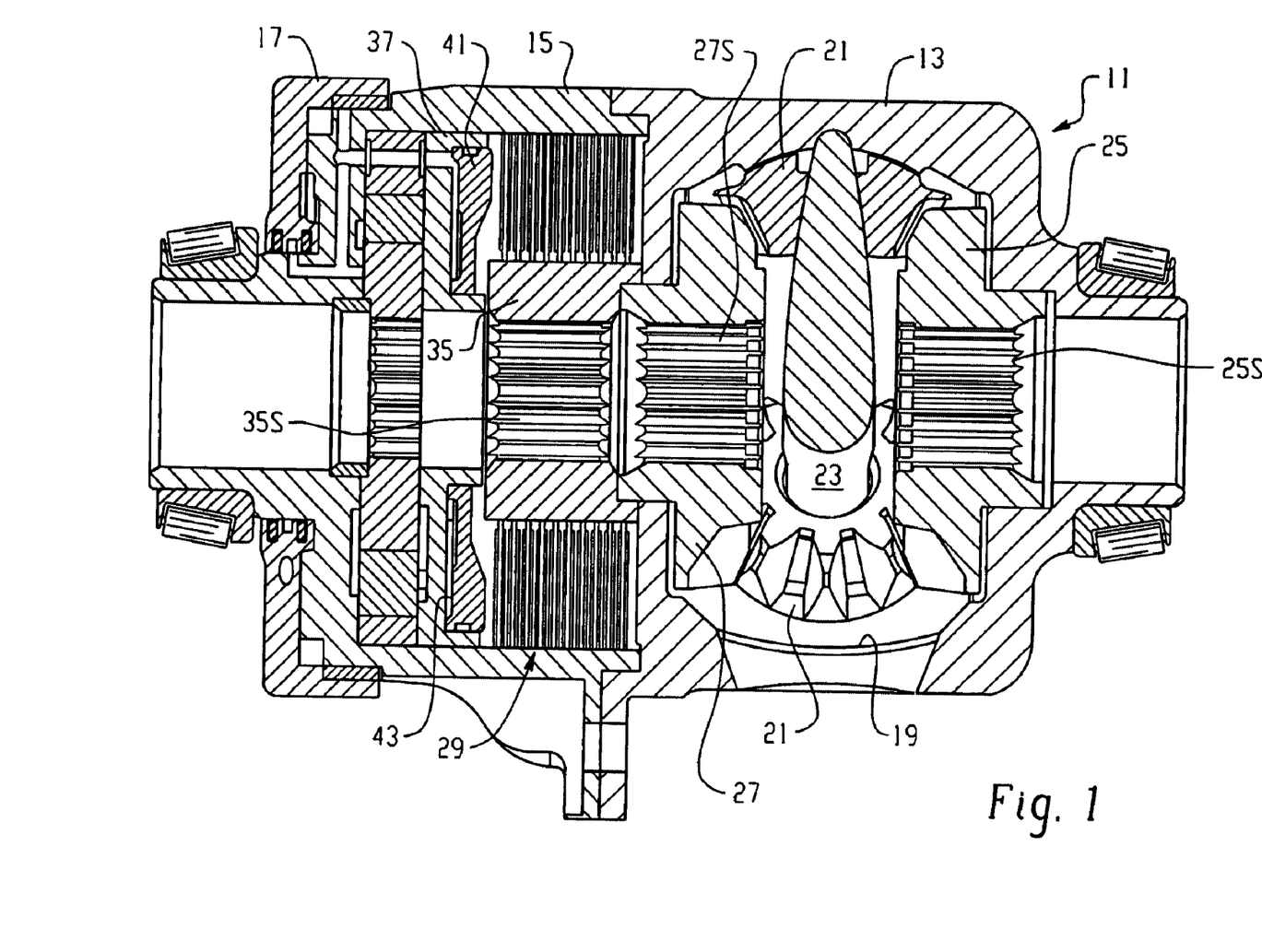
FIG. 1 is an axial cross-section of a vehicle differential coupling of the type with which the present invention may be utilized.

Referring now to the drawings, which are not intended to limit the invention, FIG. 1 illustrates a differential coupling, generally designated 11, for use in a vehicle drive line, and which is of the general type illustrated and described in the above-incorporated patents, and which is especially well suited for use in connection with the control method of the present invention. The differential coupling device 11 comprises a housing, including a gear housing 13, a clutch housing 15, and a valve housing 17, held together by any suitable means, well known in the art.

Referring still to FIG. 1, the gear housing 13 defines a gear chamber 19, and disposed therein, but by way of example only, there may be provided a typical differential gear set. In the subject embodiment, there is included a pair of input pinion gears 21, rotatably mounted relative to a pinion shaft 23, the pinion gears 21 being in toothed engagement with a pair of side gears 25 and 27. In the subject embodiment, and again by way of example only, the input pinion gears 21 (along with the housings 13 and 15) may be considered the "input" to the coupling device 11, while the side gears 25 and 27 comprises the "outputs" of the coupling device 11. More specifically, for purposes of most of the subsequent description, the side gear 27 will be considered to comprise the "output" of the coupling 11.

The side gears 25 and 27 define sets of straight, internal splines 25S and 27S, respectively, which are adapted to receive right and left axle shafts (not shown herein), whereby the coupling device 11 transmits torque by means of the axle shafts to associated vehicle drive wheels (also not shown). It should be clearly understood, however, that the structure described hereinabove is by way of example only, and the control method of the present invention may also be used with various other types of structures. In fact, the control method of the present invention may be used generally to control a pressure control valve assembly, to control a control pressure, whether in a clutch piston chamber or not.

Figure 2:
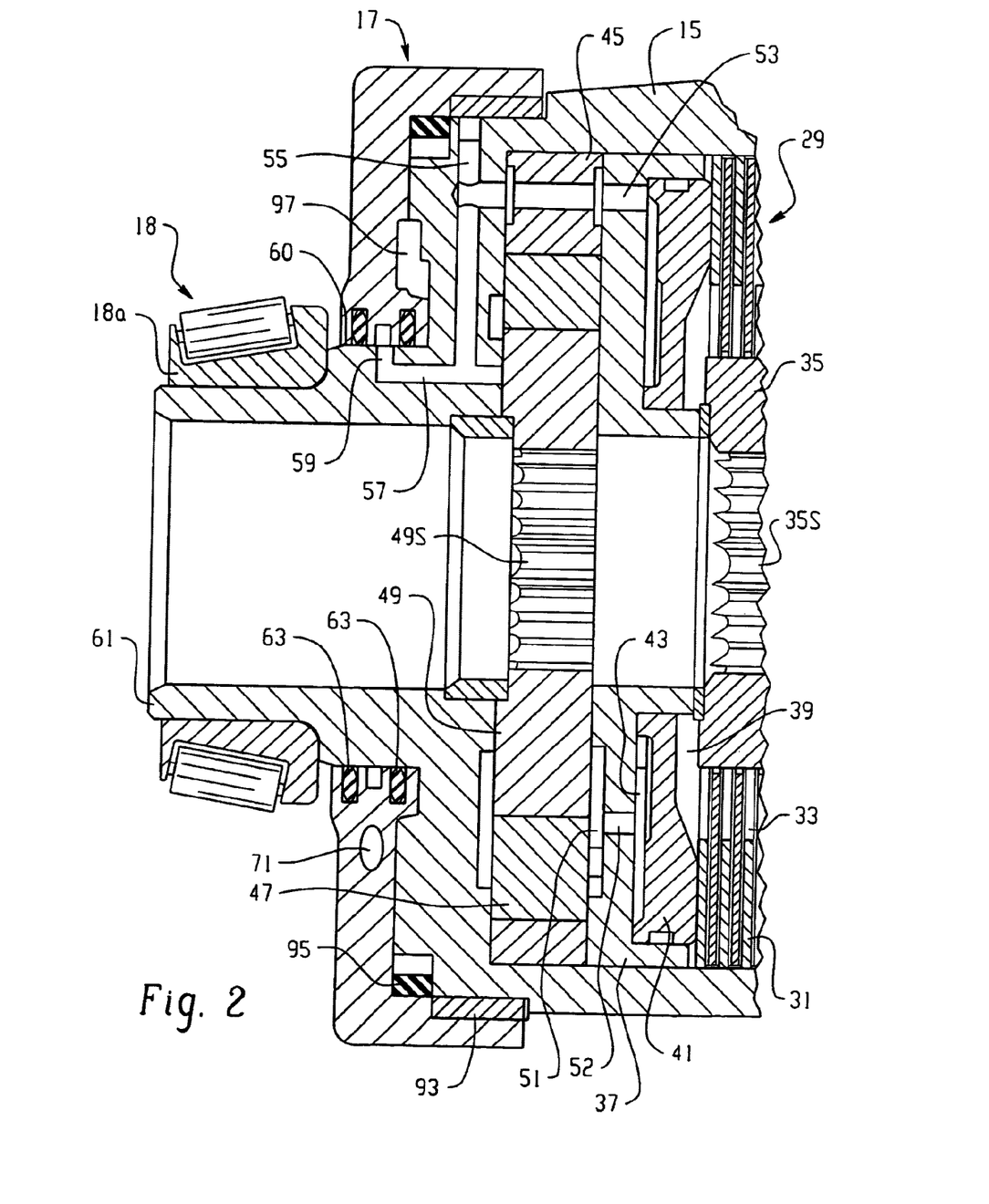
FIG. 2 is an enlarged, fragmentary, axial cross-section, similar to FIG. 1, illustrating in greater detail that portion of the coupling device with which the method of the present invention is most closely associated.

Referring still primarily to FIG. 1, there is disposed within the clutch housing 15 a clutch pack, generally designated 29 which, as is shown in greater detail in FIG. 2, comprises a plurality of outer discs 31 which are in splined engagement with a set of internal splines defined by the clutch housing 15. In addition, the clutch pack 29 includes a plurality of inner discs 33, which are interleaved with the outer discs 31 in a well known manner, the inner discs 33 being in splined engagement with a coupling member 35. The coupling member 35 defines a set of internal splines 35S, which are also in splined engagement with the left axle shaft, such that the coupling member 35 is fixed, in the subject embodiment, to rotate with the side gear 27.

Also disposed within the clutch housing 15 is an annular housing insert 37 which cooperates with the adjacent coupling member 35, and with the clutch pack 29, to define a clutch cavity or clutch piston chamber 39. Disposed within the clutch piston chamber 39, and moveable axially therein, is a clutch piston 41 which cooperates with the housing insert 37 to define a piston pressure chamber 43, which may better be seen in FIG. 2. As is well known to those skilled in the art of such devices, variations in the fluid pressure in the piston pressure chamber 43 will result in variations in the axial force applied by the clutch piston 41 to the clutch pack 29 and therefore, will result in variations in the "bias torque", i.e., the torque transmitted through the clutch pack from the input of the coupling 11 to the output.

Referring now primarily to FIG. 2, also disposed within the clutch housing 15, and immediately to the left of the housing insert 37, is a gerotor gear set comprising a stationary, eccentric member 45, an internally-toothed outer rotor 47, and an externally-toothed inner rotor 49. The inner rotor 49 defines a set of straight, internal splines 49S which are also in engagement with the left axle shaft, as described previously, such that the inner rotor 49 is fixed to rotate with the coupling member 35 and the side gear 27. As is now well known to those skilled in the art of such devices, during normal, straight-ahead operation, the entire differential coupling 11 rotates as a unit, i.e., the housings 13 and 15 and the side gears 25 and 27 and the axle shafts all rotate at the same rotational speed. In that condition, there is no relative rotation between the outer rotor 47 and the inner rotor 49, and therefore, there is no pumping of pressurized fluid from the volume chambers (formed between the teeth of the rotors 47 and 49 when they are relatively rotating).

As is also well known to those skilled in the art, based in part upon the teachings of the above-incorporated patents, when there is differentiation, i.e., when there is a difference in the speed of rotation between the left and right axle shafts, there will also, of necessity, be a speed difference between the input (housings 13 and 15 and pinion gears 21) and the output (the left axle shaft). That speed difference between the input and the output will result in the rotation of the left axle shaft driving the inner rotor 49 which, in turn, will drive the outer rotor 47, thus pumping pressurized fluid into an output chamber 51 from where it is communicated through an appropriate fluid port 52 in the housing insert 37, such that the pressurized fluid is communicated into the piston pressure chamber 43.

Referring still primarily to FIG. 2, the housing insert 37 cooperates with the eccentric member 45 and the clutch housing 15 to define an axial fluid passage 53 which is in open communication with the piston pressure chamber 43. The clutch housing 15 defines a radial fluid passage 55 which intersects the axial passage 53 and, at its radially inner extent, communicates with another axial fluid passage 57 which then, by means of a short radial passage 59, communicates to the outer cylindrical surface formed by a hub portion 61 of the clutch housing 15.

Figure 3:
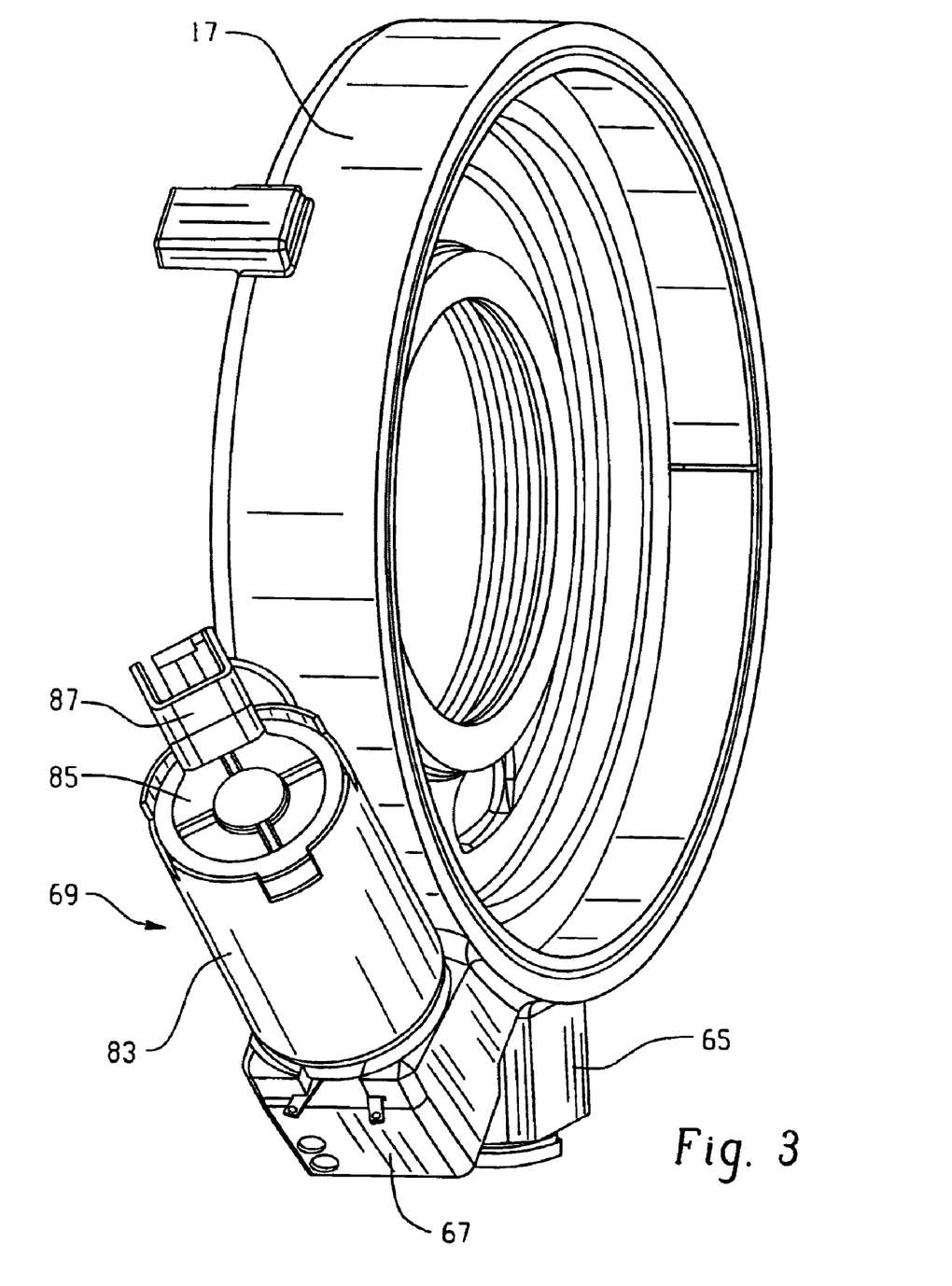
FIG. 3 is a perspective view of the valve housing portion of the coupling device shown in FIGS. 1 and 2, including an external, plan view of the control valve assembly utilized in the method of the present invention.

Referring now primarily to FIGS. 2 and 3, it may be seen that the valve housing 17, which is stationary within the outer differential housing (not shown herein), receives on its inner periphery, a pair of seal members 63 which are disposed on axially opposite sides of the radial passage 59, the seal members 63 being in sealing engagement against the adjacent, outer cylindrical surface of the hub portion 61. As may best be seen in FIG. 3, the valve housing 17 includes an inlet portion 65 which, preferably, extends down into a "source" of low pressure fluid, which would typically comprise a reservoir or sump containing fluid and disposed within the outer differential housing, as is well known in the art.

The valve housing 17 also includes a port portion 67 on which is mounted a pressure control valve assembly, generally designated 69, to be described in greater detail in connection with the description of FIG. 4. The valve housing 17 defines a generally radial passageway 71 (cut through at an angle to the plane of FIG. 2) which extends radially inward to be in continuous fluid communication with the radial passage 59, the radial passageway 71 having its radially outer end disposed within the port portion 67. Therefore, the radial passageway 71 is disposed adjacent the pressure control valve assembly 69, as is represented somewhat schematically in FIG. 4. Thus, it may be seen that, at any given point in time, the fluid pressure in the passageway 71, which is effectively the "inlet" of the pressure control valve assembly 69, is substantially identical to the fluid pressure in the piston pressure chamber 43.

Figure 4:
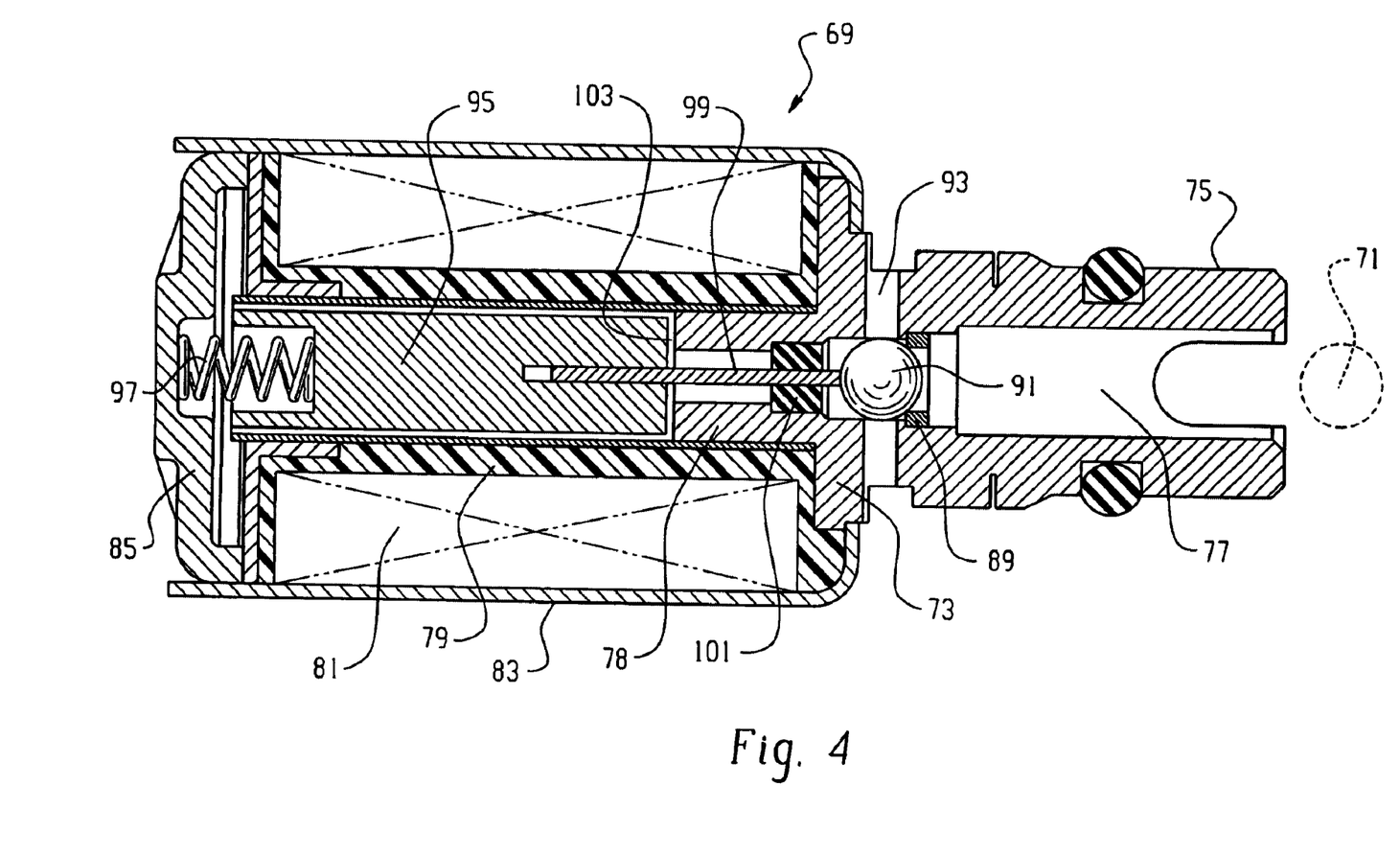
FIG. 4 is an enlarged, axial cross-section of the control valve assembly shown in external plan view in FIG. 3.

Referring now primarily to FIG. 4, but in conjunction with FIG. 3, the pressure control valve assembly 69 will be described in some detail. The valve assembly 69 includes a valve body 73, preferably comprising a ferromagnetic material, which comprises several different portions. The valve body 73 includes an inlet portion 75, which is received within the port portion 67 of the valve housing 17, and defines an inlet 77 in open fluid communication with the radial passageway 71. Finally, the valve body 73 includes a reduced diameter portion 78, which also serves as a "pole piece", as that term is well understood by those skilled in the art of electromagnetic control valves.

The larger diameter portion of the valve body 73 (i.e., the portion axially between the inlet portion 75 and the pole piece 78) supports a bobbin 79, about which is wound an electromagnetic coil 81, and the coil 81 is surrounded by, and encapsulated by, a generally cylindrical housing member 83. Disposed within an open end of the housing member 83 is a cap member 85 which has formed integrally therewith, a wiring harness support 87, shown only in FIG. 3. It will be understood by those skilled in the art that appropriate electrical input signals are transmitted to the electromagnetic coil 81 by means of wires which pass through the wiring harness support 87 and therefore, for simplicity of reference, the reference numeral "87" will also be used for the "electrical input signal" to the electromagnetic coil 81. It should be understood by those skilled in the art that although reference will be made hereinafter to varying the "current" of the electrical input signal 87, what would be more typical would be to vary the duty cycle of a pulse-width-modulated (PWM) type of signal, such that the RMS value of current would vary as the duty cycle is varied. However, the particular form of the input signal is not a limitation on the scope of the present invention.

Referring still primarily to FIG. 4, disposed within the inlet portion 75 is a generally annular steel seat member 89, against which is seated a poppet valve member comprising a steel ball 91. Disposed adjacent the steel ball 91, the valve body 73 defines one or more radial vent passages 93 which are in open fluid communication with a fluid reservoir, or fluid sump, defined by the outer differential housing (not shown herein). The fluid reservoir referred to hereinabove is the same reservoir or sump or "source" of low pressure fluid into which the inlet portion 65 extends, and draws fluid up into the valve housing 17. Therefore, hereinafter, and in the appended claims, the inlet portion 65 will be referred to as the source of low pressure fluid, in view of the fact that the portion of the structure shown in the drawings which is most closely associated with the fluid reservoir is the inlet portion 65.

Disposed at the left end (in FIG. 4) of the valve body 73 is a generally cylindrical armature member 95, and seated between the cap member 85 and the armature member 95 is a compression spring 97, biasing the armature member 95 to the right in FIG. 4. Received within an opening in the right end of the armature member 95 is a steel pin 99 which is fixed relative to the armature member 95, and passes through an elastomeric member 101. The elastomeric member 101 acts as both a fluid seal and a wiper, to wipe contamination particles off of the steel pin 99, as the pin 99 occasionally reciprocates slightly relative to the elastomeric member 101. The extreme right hand end of the steel pin 99 is disposed against the steel ball 91, holding it against the seat member 89.

In the embodiment shown in FIG. 4, and described herein, the armature 95 and the compression spring 97 together comprise the "biasing means", biasing the ball 91 against the seat member 89. However, it should be understood that, within the scope of the present invention, the spring 97 may be left out of the pressure control valve assembly 69, if the predetermined, minimum fluid pressure for the piston pressure chamber 43 is low enough that no spring bias is required. In that case, the armature 95 alone comprises the "biasing means" acting on the ball 91, but if the desired minimum fluid pressure is high enough to require the compression spring 97, then the "biasing means" comprises the armature 95 and the spring 97 acting together.

In reference to FIG. 4, the seat member 89, the ball 91 and the pin 99 have all been described as comprising "steel" members, although those skilled in the art of electromagnetic control valves will understand that, although steel is a preferred material, certain other materials may also be used. What is essential in regard to the items 89, 91, and 99 is that the hardness of each part is selected, relative to the hardness of the other parts, so that neither the seat member 89, nor the ball 91, gets damaged as a result of the periodic disengagement and re-engagement therebetween. Another factor in the selection of the materials is the likelihood of corrosion being caused by the particular oil being used within the coupling. For example, brass is frequently used for parts such as the seat member 89 and the ball 91, but the oil in the commercial, subject embodiment of the coupling 11 is corrosive to brass, and therefore, brass is unacceptable for these parts. It is believed to be well within the ability of those skilled in the art of hydraulic valves to select the appropriate materials for the items 89, 91 and 99, to meet the needs of the particular application for the valve assembly.

As was noted previously, the piston pressure chamber 43 is in relatively open, although tortuous, fluid communication with the radial passageway 71, and therefore, with the inlet 77. Therefore, whenever there is differentiation occurring within the coupling 11, thus resulting in relative rotation between the outer rotor 47 and inner rotor 49, pressurized fluid is pumped from the contracting fluid volume chambers through the output chamber 51, through the fluid port 52, and into the piston pressure chamber 43. As differentiation continues, over even a very short period of time, the fluid pressure in the pressure chamber 43 will rapidly increase, subject to the operation of the pressure control valve assembly 69, as will be explained subsequently. In the subject embodiment of the present invention, with the inner rotor 49 having six teeth (or lobes), fluid pressure in the pressure chamber 43 will increase substantially within one-sixth of a revolution of the rotor 49. How long a period of time is required to build pressure will depend, in part, on the speed of differentiation between the input and the output, as is well known in the art of differentiating type devices.

As is also well known to those skilled in the art, one of the key operating parameters of the coupling 11 is its "response time" which, in this context, means the time required for the coupling 11 to change (transition) from a disengaged condition (with the clutch pack 29 transmitting either substantially zero torque, or some predetermined minimum bias torque), to a particular, selected torque transmitting condition of the coupling 11 (in which a certain, predetermined bias torque is being transmitted by the clutch pack 29). In accordance with one aspect of the present invention, the fluid pressure in the pressure chamber 43 may be maintained at some predetermined minimum fluid pressure, corresponding to a predetermined minimum bias torque on the clutch assembly 29. Typically, to achieve fastest response time, this predetermined minimum fluid pressure would be a pressure just below the pressure required to move the clutch piston 41 into effective engagement with the clutch pack 29. Therefore, in the subject embodiment, when there is no electrical input signal 87 to the electromagnetic coil 81, the total biasing force exerted against the poppet valve member (steel ball) 91 is determined solely by the biasing force of the compression spring 97. However, by maintaining the fluid pressure in the piston pressure chamber 43 just below, or somewhat below, what is required to begin to engage the clutch pack 29, the time for the coupling to "respond" (i.e., to transition the clutch pack 29 from disengaged to engaged), is greatly reduced., and the overall response of the system is substantially improved.

In the "zero torque bias" condition being selected (by virtue of the electrical input signal 87 being "off"), if there is sufficient differentiation to rotate the rotors 47 and 49 and pump sufficient fluid into the pressure chamber 43, so that the pressure chamber 43 would rise above the predetermined minimum fluid pressure (needed to engage the clutch pack 29), that same fluid pressure, also present in the inlet 77, will overcome the force of the compression spring 97 and "lift" the poppet valve member 91 (move it slightly to the left in FIG. 4) just enough to bleed or vent the pressurized fluid past the seat member 89, and out through the radial passages 93 to the reservoir or sump as described previously. The poppet valve member 91 will re-seat against the seat member 89 when an equilibrium condition is re-established between the predetermined minimum fluid pressure in the chamber 43 (and in the inlet 77) and the force of the compression spring 97. In other words, "equilibrium" is achieved whenever the force exerted on the ball 91 by the spring 97 is equal to the force exerted on the ball 91 by the fluid pressure in the inlet 77 acting on the ball 91, i.e., over the area within the inside diameter of the seat member 89.

When it is desired to increase the torque bias of the coupling 11, the electrical input signal 87 is merely increased to some predetermined current level (corresponding to the desired torque bias), such that the total force on the poppet valve member 91 becomes the sum of the force of the compression spring 97, and the force exerted by the armature member 95 and steel pin 99 (i.e., under the influence of the electromagnetic force from the coil 81). In accordance with an important aspect of the present invention, it is thus possible progressively to increase the fluid pressure in the piston pressure chamber 43 simply by increasing the electrical input signal 87, but this increased "setting" occurs without any substantial movement of the poppet valve member 91, and requires no flow through the valve (or change in a rate of flow, etc.). Instead, the pressure in the chamber 43 increases in response to an increase in the force tending to seat the poppet valve member 91, as it remains seated. Thus, it has been stated herein, and in the appended claims, that the pressure in the pressure chamber 43 is increased, but with "no substantial movement" of the poppet valve member 91.

As a result, the performance and response time of the coupling 11, and the pressure control valve assembly 69, are relatively independent of factors such as the fluid viscosity and fluid temperature, factors which typically cause substantial variations in the performance and response time of the prior art pressure control valves and clutch control systems.

What has been stated above in regard to increasing the fluid pressure in the chamber 43 by increasing the current to the coil 81 also applies generally in the reverse condition, i.e., as the current to the coil 81 is decreased from a relatively high current level, the total force exerted on the poppet valve member 91 also decreases, and therefore, the pressure in the piston pressure chamber 43 decreases. However, as a practical matter, the decreasing pressure in response to a decreasing current to the coil 81 does require just enough movement of the poppet valve member 91 from the seat to bleed enough fluid from the inlet 77 to the reservoir to reach the reduced pressure level desired. As will be understood by those skilled in the art, from a reading and understanding of the foregoing specification, if, at any time, the pressure in the inlet 77 exerts a force against the steel ball 91 (i.e., against the area of the ball 91 within the ID of the seat member 89), which is greater than the total force of the biasing means, i.e., force exerted on the ball 91 by the spring 97 and the electromagnetic coil 81, the ball 91 will lift slightly from its seat 89 and relieve just enough fluid pressure (through the vent passages 93) to re-establish the equilibrium condition between the opposing forces acting on the ball 91. Thereafter, the ball 91 will again be seated, and remain seated as long as the equilibrium condition remains.

Referring again primarily to FIG. 4, it may be seen that between the left end of the reduced diameter portion 78 and the right end of the armature member 95, there exists an air gap 103, as is generally well known to those skilled in the solenoid valve art as the "working air gap". However, in accordance with an important aspect of the invention, the air gap 103 remains substantially "constant" (i.e., the axial "gap length" in FIG. 4) because of the fact that pressure changes (in the pressure chamber 43) occur without substantial movement of the poppet valve member 91 (and therefore, without substantial movement of the armature member 95). The constant air gap 103 (even as the electrical input signal 87 and the pressure in inlet 77 vary) makes it much more feasible to provide a predetermined, known relationship of "control" pressure (in inlet 77 and pressure chamber 43), as a function of electrical current (to the coil 81). The constant working air gap 103 determines the magnetic calibration of the pressure control valve assembly 69, because the air gap 103 determines, for a given current applied to the coil 81, the electromagnetic force applied to the armature, and thus, the force applied to the pin 99 and the ball 91. The pin 99 is pressed into the armature 95 to a specific, predetermined depth as part of the process of setting the calibration, as will be explained further subsequently.

During the assembly process, a measurement is taken from the "top" of the steel ball 91 (i.e., the leftmost end in FIG. 4) to the "top" of the pole piece 78 (i.e., the leftmost end in FIG. 4). To that measured distance is added the desired amount of the working air gap 103, and then the steel pin 99 is pressed into the armature 95 until the pin extends from the armature a distance equal to the sum of the measured distance plus the desired working air gap 103. After the above calibration-and-assembly step has been performed, the working air gap 103 should be substantially equal to the desired gap. By way of example only, in the intended, commercial version of the pressure control valve assembly 69, the working air gap 103 is about 0.009 inches (about 0.228 mm).

If the desired working air gap 103 is achieved, then it is possible also to achieve the predetermined, known relationship of control pressure in the piston pressure chamber 43 (and inlet 77) to the input signal 87 to the electromagnetic coil 81, without any further calibration or adjustments.

One further step in the calibration-and-assembly of the pressure control valve assembly 69 is rotating the cap member, in the absence of a current to the coil 81, until the force of the spring 97 on the ball 91 is in equilibrium with a known, predetermined fluid pressure in the chamber 43 and the inlet 77. As explained previously, this known, predetermined fluid pressure would, in a coupling of the type shown herein (but by way of example only) correspond to a "standby" pressure to be maintained in the piston pressure chamber 43 when it is intended for the clutch pack 29 to be disengaged, but with the fluid pressure in the chamber 43 being maintained at a pressure high enough that engagement of the clutch pack 29 can be accomplished very quickly. Of course, in a given application for the pressure control valve assembly 69, if the standby pressure is to be at nearly zero pressure, the compression spring 97 would be left out of the assembly 69, as discussed previously, in which case the calibration step described above would be eliminated from the calibration-and-assembly process.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A method of controlling the transmission of torque in a coupling device including an input and at least one output, the coupling device comprises a housing defining a clutch cavity; a clutch assembly disposed in said clutch cavity and including a first clutch member fixed to rotate with said input and a second clutch member fixed to rotate with said output; a clutch apply member disposed in a pressure chamber and operable to bias said first and second clutch members into torque-transmitting relationship in response to the presence of pressurized fluid in said pressure chamber; said coupling device including a source of said pressurized fluid, and a control valve assembly operable to vary the fluid pressure in said pressure chamber in response to variations in an electrical input signal transmitted to an electromagnetic coil; said control valve assembly defining an inlet in fluid communication with said pressure chamber, an outlet in fluid communication with a source of low pressure fluid, and a valve seat disposed intermediate said inlet and said outlet; a poppet valve member biased toward said valve seat by a biasing means including an armature, the biasing force applied by said armature to said poppet valve member being generally proportional to said electrical input signal to said electromagnetic coil; said method comprising the steps of:

(a) selecting a predetermined minimum fluid pressure in said pressure chamber, corresponding to a predetermined minimum bias torque for said clutch assembly;

(b) selecting said biasing means to apply a biasing force to said poppet valve member corresponding to a fluid pressure less than said predetermined minimum fluid pressure;

(c) selecting said electrical input signal to correspond to a desired fluid pressure in said pressure chamber and a desired bias torque for said clutch assembly, an increasing electrical input signal resulting in an increasing biasing force on said poppet valve member, but with no substantial movement thereof.

2. A method of controlling the transmission of torque in a coupling device, as claimed in claim 1, characterized by the additional step, in the event that the fluid pressure in said pressure chamber increases beyond said desired fluid pressure of:

(d) permitting said poppet valve member to lift from said valve seat, thus permitting pressurized fluid from said pressure chamber to flow past said valve seat to said source of low pressure fluid until equilibrium is re-established between the opposing forces on said poppet valve member.

3. A method of controlling the transmission of torque in a coupling device, as claimed in claim 1, characterized by said source of pressurized fluid comprises means operable to provide a generally continuous flow of pressurized fluid into said pressure chamber, at least during the time that said coupling device is transmitting torque.

4. A method of controlling the transmission of torque in a coupling device, as claimed in claim 3, characterized by said source of pressurized fluid comprises pumping means operable to pump pressurized fluid into said pressure chamber at a flow rate generally proportional to the difference in speed between said input and said output.

5. A method of controlling the transmission of torque in a coupling device as claimed in claim 1, characterized by said biasing means further comprises a biasing spring, and said step of selecting said biasing means includes the step of selecting said spring to apply said biasing force to said poppet valve member corresponding to said fluid pressure less than said predetermined minimum fluid pressure.

6. A method of controlling a pressure control valve assembly to control a control pressure in a system including a source of pressurized fluid; said control valve assembly being operable to vary the fluid pressure of said control pressure in response to variations in an electrical input signal transmitted to an electromagnetic coil; said control valve assembly defining an inlet in fluid communication with said control pressure, an outlet in fluid communication with a source of low pressure fluid, and a valve seat disposed intermediate said inlet and said outlet; a poppet valve member biased toward said valve seat by a biasing means including an armature, the biasing force applied by said armature to said poppet valve member being generally proportional to said electrical input signal to said electromagnetic coil; said method comprising the steps of:

(a) selecting a predetermined, minimum fluid pressure for said control pressure, corresponding to a predetermined minimum condition for said system;

(b) selecting said biasing means to apply a biasing force to said poppet valve member corresponding to a fluid pressure less than said predetermined minimum fluid pressure for said control pressure;

(c) selecting said electrical input signal to correspond to a desired fluid pressure for said control pressure, an increasing electrical input signal resulting in an increasing biasing force on said poppet valve member, but with no substantial movement thereof.

7. A method of controlling a pressure control valve assembly as claimed in claim 6, characterized by said biasing means further comprises a biasing spring, and said step of selecting said biasing means includes the step of selecting said spring to apply said biasing force to said poppet valve member corresponding to said fluid pressure less than said predetermined minimum fluid pressure.

* * * * *